US008009734B2

(12) United States Patent
Cote et al.

(10) Patent No.: US 8,009,734 B2
(45) Date of Patent: *Aug. 30, 2011

(54) METHOD AND/OR APPARATUS FOR REDUCING THE COMPLEXITY OF H.264 B-FRAME ENCODING USING SELECTIVE RECONSTRUCTION

(75) Inventors: Guy Cote, Elora (CA); Michael D. Gallant, Guelph (CA); Pavel Novotny, Waterloo (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 645 days.

This patent is subject to a terminal disclaimer.

(21) Appl. No.: 11/879,944

(22) Filed: Jul. 19, 2007

(65) Prior Publication Data

US 2007/0263724 A1    Nov. 15, 2007

Related U.S. Application Data

(63) Continuation of application No. 10/449,471, filed on May 30, 2003, now Pat. No. 7,310,371.

(51) Int. Cl.
*H04N 7/12* (2006.01)
*H04N 11/02* (2006.01)
*H04N 11/04* (2006.01)

(52) U.S. Cl. .......... 375/240.15; 375/240.13; 375/240.29

(58) Field of Classification Search .............. 375/240.15
See application file for complete search history.

(56) References Cited

U.S. PATENT DOCUMENTS

| 5,198,901 A | 3/1993 | Lynch ..................... 375/240.14 |
| 6,160,503 A | 12/2000 | Andrews et al. ................ 341/94 |
| 2004/0218668 A1 | 11/2004 | Hannuksela et al. .... 375/240.01 |

OTHER PUBLICATIONS

International Telecommunication Union (ITU), Annex J of Video coding for low bit rate communication, Feb. 1998, ITU, H.263, 81-84.*
Joint Video Team of ISO/IEC MPEG and ITU-T VCEG, Working Draft No. 2 Revision 2, Mar. 15, 2002, pp. 28-33, 60-62 and 95-96.

* cited by examiner

*Primary Examiner* — Mehrdad Dastouri
*Assistant Examiner* — Jeremaiah C Hallenbeck-Huber
(74) *Attorney, Agent, or Firm* — Christopher P. Maiorana, PC

(57) ABSTRACT

A method for implementing B-frame prediction in video compression comprising the steps of (A) setting a prediction flag (i) "off" if B-frames are used for block prediction and (ii) "on" if B-frames are not used for block prediction, (B) if the prediction flag is off, generating an output video signal in response to an input video signal by performing an inverse quantization step and an inverse transform step in accordance with a predefined coding specification and (C) if the prediction flag is on, bypassing the inverse quantization step and the inverse transform step.

12 Claims, 3 Drawing Sheets

METHOD AND/OR APPARATUS FOR REDUCING THE COMPLEXITY OF H.264 B-FRAME ENCODING USING SELECTIVE RECONSTRUCTION

This is a continuation of U.S. Ser. No. 10/449,471, filed May 30, 2003.

FIELD OF THE INVENTION

The present invention relates to digital video generally and, more particularly, to a method and apparatus for reducing the complexity of H.264 B-frame encoding using selective reconstruction.

BACKGROUND OF THE INVENTION

Digital video compression standards attempt to provide efficient solutions to transfer video. Digital video compression technology reduces the statistical redundancy, perceptual point of view information irrelevancy, and high level features that are redundant across space and time in a source video signal. Compression is represented as compressed frames, where a frame is a snapshot in time. Conventional frames can be of I, P, or B type. I-frames are intra-picture frames compressed using intra-frame coding. P-frames are predicted-picture frames coded using motion-compensated prediction from previously encoded I-frames or P-frames. B-frames are bi-directional predicted picture frames using motion-compensated prediction from previously encoded and/or future encoded I-frames or P-frames. B-frames provide the most compression.

Several successful standards have emerged (e.g., (i) ITU-T H.261: "Video Codec for Audiovisual Services at px64 kbit/s", Geneve 1990, ITU-T, (ii) H.263: "Video Coding for Low Bitrate Communication", Geneve 1996, (iii) ISO/IEC MPEG-1 11172-2:1993 Information Technology—Coding of Moving Pictures and Associated Audio for digital storage media at up to 1.5 Mbits/s. Part2, (iv) MPEG-2 ISO/IEC 13818-2:2000 Information Technology—Generic Coding of Moving Pictures and Associated Audio Information. Part2: Video and (v) MPEG-4 ISO/IEC 14496-2:2001 Information Technology—Coding of audio-visual objects. Part 2: Visual), each of which is incorporated by reference in its entirety. These standards address a wide range of applications having different needs in terms of bit rate, picture quality, complexity, error resilience and delay, as well as improved compression ratios.

MPEG-2 encoding has been a key technology used in conventional digital video compression. MPEG-2 does not use B-frames for prediction of other pictures. H.264 encoding provides quality equivalent to MPEG-2, but uses lower bit rates. Alternately, H.264 encoding can provide an improved quality using the same bit rate. However, H.264 encoding is more complex and uses more processing than MPEG-2 encoding. H.264 sometimes uses B-frames for prediction.

The computational needs of conventional digital video encoding compression are extremely high. Compression of digital video without significant quality degradation is usually possible because video sequences contain a high degree of 1) spatial redundancy (due to the correlation between neighboring pixels), 2) spectral redundancy (due to correlation among the color components), 3) temporal redundancy (due to correlation between video frames) and 4) psycho-visual redundancy (due to properties of the human visual system (HVS)).

In conventional video compression standards, since B-frames are not used as reference frames for video compression, the reconstruction process of B-frame encoding may be skipped. Avoiding such reconstruction significantly reduces the computational burden. However, because of various intra-picture prediction modes present in H.264, the reconstruction of B-frames cannot merely be skipped. Therefore, conventional solutions used in MPEG-2 cannot be applied to MPEG-4 Part 10.

It would be desirable to implement a method and/or apparatus to reduce the complexity of video encoding of digital video bitstreams, such as MPEG-4 part 10 compliant bitstreams.

SUMMARY OF THE INVENTION

One aspect of the present invention concerns a method for implementing B-frame prediction in video compression comprising the steps of (A) setting a prediction flag (i) "off" if B-frames are used for block prediction and (ii) "on" if B-frames are not used for block prediction, (B) if the prediction flag is off, generating an output video signal in response to an input video signal by performing an inverse quantization step and an inverse transform step in accordance with a predefined coding specification and (C) if the prediction flag is on, bypassing the inverse quantization step and the inverse transform step.

Another aspect of the present invention concerns an apparatus comprising an output circuit, a first processing circuit and a second processing circuit. The output circuit may be configured to generate an output data stream in response to (i) a first intermediate signal, (ii) a second intermediate signal, and (iii) a third intermediate signal. The first processing circuit may be configured to generate the first intermediate signal in response to (i) a processed video signal and (ii) a prediction flag. The second processing circuit may be configured to generate (i) the processed video signal, (ii) the second intermediate signal and (iii) the third intermediate signal in response to an input video signal.

The objects, features and advantages of the present invention include providing digital video system that may (i) skip the deblocking filter stage, (ii) keep track of macroblock modes and selective reconstruction macroblock that are used for intra prediction, (iii) select a constrained intra prediction mode, and/or (iv) use a constrained intra prediction flag as an indication to reconstruct only I-coded macroblocks in a B-frame. The present invention may also (i) improve encoding performance, (ii) reduce the complexity of implementation and (iii) reduce computation and memory use without compromising H.264 syntax compliance or operability with H.264 decoders.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

H.264 defines an encoding syntax along with a method to decode. The present invention may be used for encoding, while maintaining H.264 decoder syntax compliance, but may reduce the complexity of the encoding process. In particular, the present invention may reduce complexity in H.264 B-frame processing when the B-frames are not used in prediction.

A coding mode where temporal prediction is used is generally referred to as an "inter" mode. The inter mode is generally selected if the motion compensation process is effective, and only if a prediction error macroblock (e.g., the difference between the original macroblock and the motion compensated predicted macroblock) needs to be encoded. A coding mode where temporal prediction is not used, is generally referred to as an "intra" mode. The selection between modes is generally made at the macroblock level. The performance of the motion estimation process, often measured in terms of the associated distortion values, may be used to select the coding mode.

Figure 1:
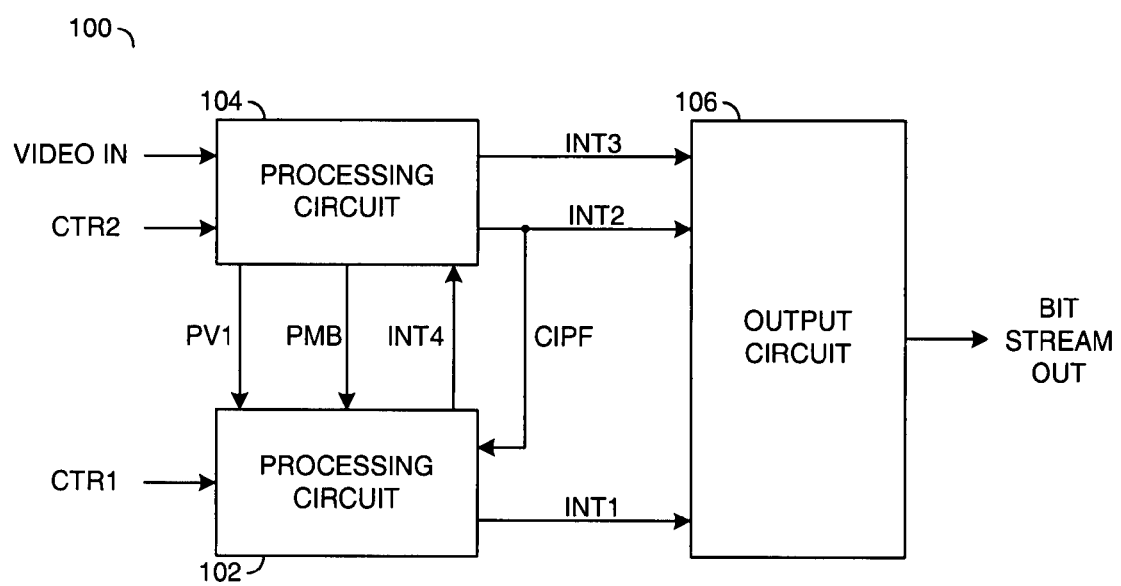
FIG. 1 is a block diagram of a preferred embodiment of the present invention.

Referring to FIG. 1, a diagram of a system 100 is shown illustrating a preferred embodiment of the present invention. The system 100 generally comprises a processing block (or circuit) 102, a processing block (or circuit) 104 and an output block (or circuit) 106. The output circuit 106 may be implemented as an entropy coding block. The various components of the present invention are described as blocks and/or circuits. However, the various components may be implemented in hardware, software or a combination of hardware and software. Software may be used to describe firmware, VHDL code, etc.

The entropy coding block 106 may generate an output video bitstream (e.g., OUT) in response to an intermediate signal (e.g., INT1), an intermediate signal (e.g., INT2) and an intermediate signal (e.g., INT3). The processing circuit 102 may generate the signal INT1 in response to a processed video signal (e.g., PV1). The signal PV1 may be generated by the processing circuit 104. The processing circuit 102 may also generate a signal (e.g., INT4) and may receive a signal (e.g., PMB). The signal PMB may be referred to as a prediction (or predictor) macroblock that may be received from the processing block 104. The prediction macroblock PMB may be used by the processing circuit 102. The processing circuit 104 may generate the signal INT2, the signal INT3, the signal PV1 and the signal PMB in response to the signal INT4 and an input video signal (e.g., VIDEO_IN). One bit of the signal INT2 may be presented as a flag (e.g., CIPF). The flag CIPF may represent a constrained intra prediction flag (to be discussed in more detail in connection with FIGS. 2 and 3). The processing circuit 102 may also receive a control signal (e.g., CTR1). Similarly, the processing circuit 104 may receive a control signal (e.g., CTR2).

Figure 2:
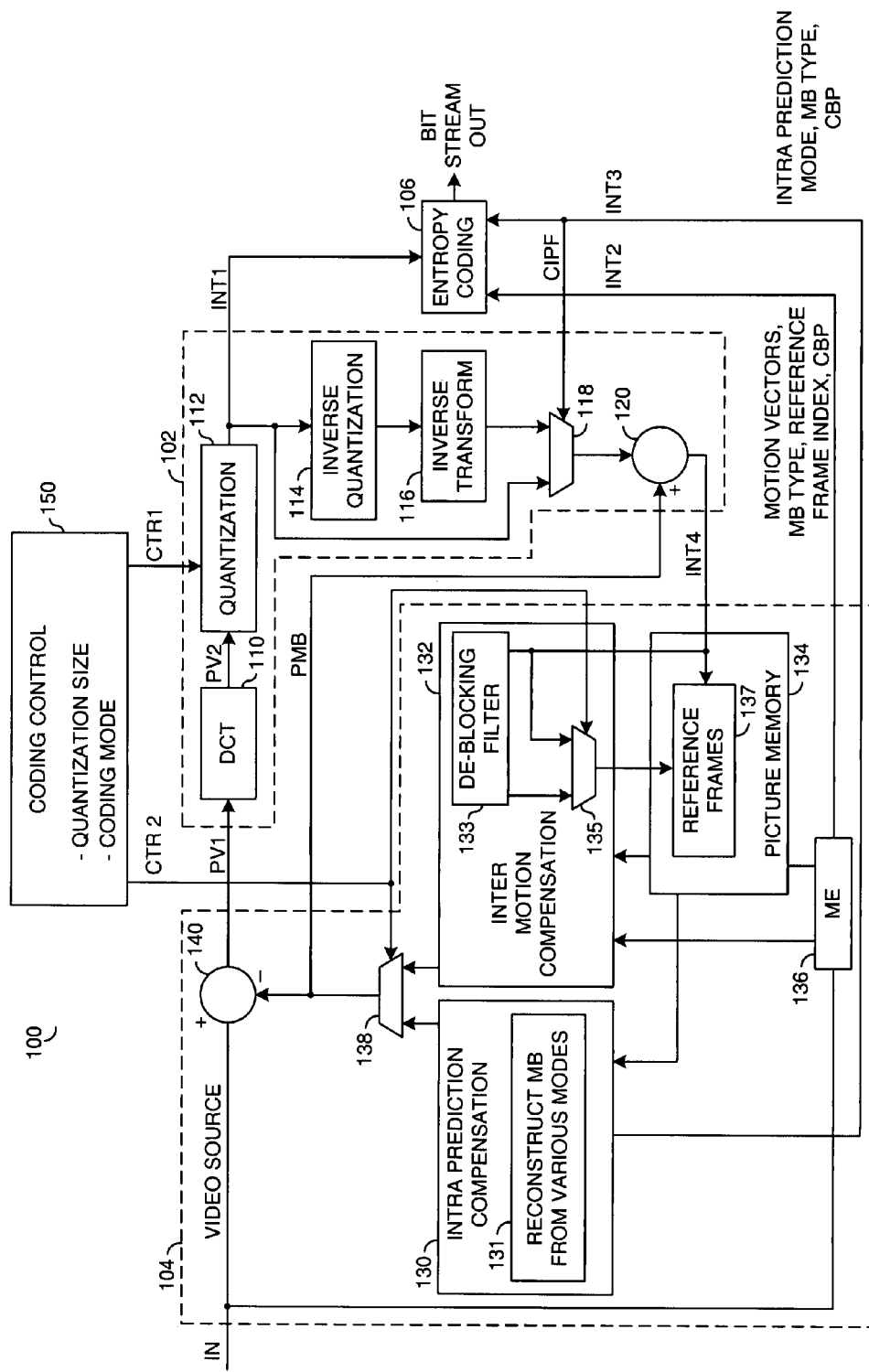
FIG. 2 is a more detailed diagram of the system of FIG. 1.

Referring to FIG. 2, a more detailed diagram of the system 100 is shown. The system 100 is shown including a control block (or circuit) 150. The control block 150 may be implemented as a coding control block. The block 150 may present the control signals CTR1 and CTR2. The control signals CTR1 and CTR2 may control one or more parameters such as quantization size and/or coding mode.

The processing circuit 102 generally comprises a block (or circuit) 110, a block (or circuit) 112, a block (or circuit) 114, a block (or circuit) 116, a block (or circuit) 118 and a block (or circuit) 120. The block 110 may be implemented as a discrete cosine transform circuit. The block 112 may be implemented as a quantization circuit. The block 114 may be implemented as an inverse quantization circuit. The inverse quantization circuit 114 may be used to reverse the quantization process previously performed on the data set (e.g., the signal PV2) by the circuit 112. The inverse quantization circuit 114 generally builds a matrix of values used by the block 116. The block 116 may be implemented as an inverse transform circuit. The inverse transform circuit 116 generally reverses the DCT process that was performed by the block 110, transforming the data set to the spatial domain. The inverse transform circuit may also be referred to as an inverse DCT block or an IDCT block.

The block 118 may be implemented as a multiplexer, such as a 2-1 multiplexer. The block 118 may be used for selecting between (i) a first path that includes the inverse quantization block 114 and the inverse transform block 116 or (ii) a second mode that bypasses the block 114 and the block 116. The block 120 may be implemented as a summing block. The block 120 may add the output of the block 120 with the predictor macroblock PMB.

The processing block 104 generally comprises a block (or circuit) 130, a block (or circuit) 132, a block (or circuit) 134, a block (or circuit) 136, a block (or circuit) 138 and a block (or circuit) 140. The circuit 130 may be implemented as an intra prediction compensation circuit. The circuit 130 may include a block 131. The block 131 may reconstruct macroblocks from the various modes. The circuit 132 may be implemented as an inter motion compensation circuit. The circuit 132 may also include a block (or circuit) 133 and a block (or circuit) 135. The block 133 may be implemented as a de-blocking filter. The circuit 135 may be implemented as a multiplexer, such as a 2-1 multiplexer. The circuit 135 may select between an output of the de-blocking filter 133 and a bypass of the de-blocking filter 133. The circuit 134 may be implemented as a picture memory circuit. The circuit 134 may include a block (or circuit) 137. The block 137 may be implemented to store one or more reference frames. The circuit 136 may be implemented as a motion estimation circuit. The circuit 138 may be implemented as a multiplexer, such as a 2-1 multiplexer. The circuit 140 may be implemented as a subtractor circuit. The circuit 140 generally subtracts the predicted macroblock PMB from the input video signal IN to generate the signal PV1.

The intermediate signal INT2 may contain one or more control signals. The control signals may include motion vectors, macroblock type, reference frame index, coded block pattern (CPB) information, etc. The intermediate signal INT3 may contain one or more control signals. The control signals may include intra prediction mode information, macroblock type, CPB, etc. One of the control signals contained in the signal INT3 may be the constrained intra prediction flag (CIPF). The flag CIPF may be used to determine if certain stages of the system 100 may be bypassed.

Figure 3:
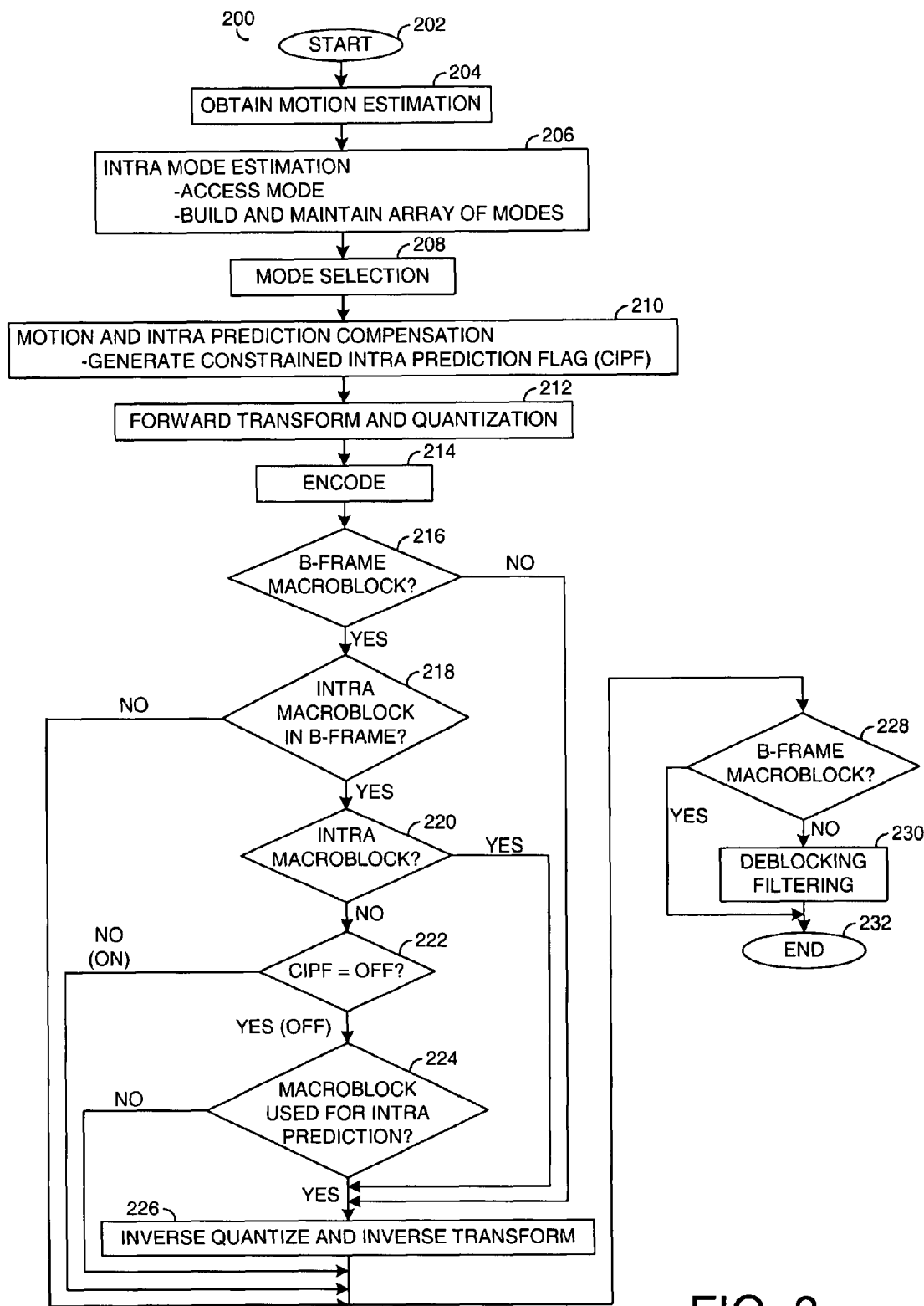
FIG. 3 is a flow diagram of the present invention.

Referring to FIG. 3, a diagram of a method or process 200 is shown in accordance with a preferred embodiment of the present invention. The method 200 generally comprises a state 202, a state 204, a state 206, a decision state 208, a state 210, a state 212, a state 214, a decision state 216, a decision state 218, a decision state 220, a decision state 222, a decision state 224, a state 226, a decision state 228, a state 230 and a state 232. The state 202 generally starts the method 200. The state 204 may obtain motion estimation information. The motion estimation information may be obtained using the block 136. The state 206 generally performs intra mode estimation. The state 206 may (i) determine the macroblock mode and (ii) build a link chain in an array storing the previous macroblock. The state 206 may be implemented in the circuit 130.

The state 208 generally selects a mode of operation. The state 208 may be implemented in the circuit 130. The state 210 generally provides motion and intra prediction compensation to generate the constrained intra prediction flag CIPF. The state 210 may also provide reconstruction of a previous macroblock, if needed for additional processing when the system is in the intra mode. The state 210 may be implemented in the circuit 130. The state 212 generally performs forward transform and quantization. The state 212 may be implemented in the circuits 110 and 112. The state 214 generally performs encoding. Encoding may be performed by the circuit 106.

The state 216 generally determines if a B-frame macroblock is present. If not, the method 200 moves to the state 226. If a B-frame is present, the method 200 moves to the state 218. The decision state 218 determines if intra macroblocks are needed for B-frame decoding. If so, the method 200 moves to the decision state 220. If not, the method 200 moves to the decision state 228. The decision state 220 determines if intra macroblocks are present. If so, the method 200 moves to the state 226. If not, the method 200 moves to the decision state 222. The decision state 222 determines if the flag CIPF is on or off. If the flag CIPF is off, the method 200 moves to the decision state 224. If the flag CIPF is on, the method 200 moves directly to the decision state 228. The decision state 224 determines if the macroblock is used for intra prediction. If so, the method 200 moves to the state 226. If not, the method 200 moves to the decision state 228. The state 226 performs inverse quantization and inverse transform operations. The state 226 may be implemented in the circuit 114 and the circuit 116.

The state 228 determines if a B-frame macroblock is present. If a B-frame macroblock is present, the method 200 moves to the state 232 and the method 200 ends. If a B-frame macroblock is not present, the method 200 moves to the state 230. The state 230 performs deblocking filtering. The state 236 may be implemented inside the block 132. In one example, the system 100 may be implemented without using intra macroblocks in B-frame processing. With such an implementation, the flag CIPF may not need to be checked.

In one example, a macroblock may be defined as 16×16 pixels of a source image datastream to be compressed. However, other sizes of macroblocks may be implemented to meet the design criteria of a particular implementation.

An H.264 compliant system has each macroblock encoded in either the intra mode or the inter mode. The intra mode generally involves processing macroblocks within a picture. In the intra mode, digital video may be processed spatially. In the intra mode, the processing of the space involves a current time snapshot of the picture. The inter mode generally involves processing macroblocks relative to reference pictures. In the inter mode, digital video may be processed temporally. In the inter mode, the space of multiple time snapshot pictures may be processed. In either mode, the predictor macroblock PMB is generated based on a reconstructed frame. In the intra mode, the predictor macroblock PMB may be generated from samples in the current frame that have previously gone through the encode, decode and reconstruction process. In the inter mode, the macroblock PMB is generated by motion compensation prediction from reference frames. The predictor macroblock PMB is subtracted from the currently processed macroblock to generate a difference macroblock (e.g., PV1 in FIG. 1). The difference macroblock PV1 is generally transformed using the DCT circuit 110 to generate a signal (e.g., PV2 in FIG. 1). The signal PV2 is generally quantized to produce the intermediate signal INT1, which may contain quantized transform coefficients. The entropy coding output circuit 106 generally re-orders the quantized transform coefficients to be encoded. The coding circuit 106 may provide lossless encoding. The entropy coding output circuit 106 (along with the macroblock prediction mode, the quantizer step size, and the motion vector information) may present an H.264 syntax compliant compressed bitstream OUT.

When the flag CIPF is a 0, the intra mode prediction allows the use of neighboring intra inter frame macroblock residual data. The decoded samples may be used for the prediction of intra frame macroblocks. When the flag CIPF is a 1, the constrained intra mode prediction uses residual data and decoded samples from I macroblock types only. The flag CIPF is generally related to motion and intra mode prediction compensation. The signal PMB generally comprises the entire predicted macroblock values used at the block 120. The predicted macroblock values PMB generally represent a result of the collective processing of the circuits 130, 132, 134, 136 and 138. The flag CIPF is typically implemented as a register bit that may be set during encoding and is sent to the Entropy Coding via INT3.

H.264 frame reconstruction occurs when the quantized macroblock coefficients are decoded. The coefficients are processed by the inverse quantization circuit 114 and the inverse transform circuit 116. The quantization generally reduces the precision, generating some loss. The signal PMB is added to the output of the circuit 118 to create the intermediate signal INT4, a reconstructed macroblock. The de-blocking filter 133 may be implemented to reduce the effects of the block boundary on encoding.

The video source signal IN is generally presented to the block 140 as well as the motion estimation block 136. The DCT circuit 110 presents a frequency based signal (e.g., PV2) to the quantization circuit 112. The quantization circuit 112 presents the signal INT1 to (i) the inverse quantization circuit 114, (ii) the entropy encoding circuit 106 and (iii) the bypass multiplexer 118. The multiplexer 118 generally presents the signal INT1 (e.g., bypassing the circuit 114 and the circuit 116) when the current macroblock is not used for intra mode B-frame processing.

The motion estimation circuit 136 processes the signal VIDEO_IN with the picture memory circuit 134 to produce motion estimation information for the inter motion compensation circuit 132 and the entropy coding circuit 106. The intra prediction motion compensation circuit 130 receives information from the picture memory 134. The intra prediction and motion compensation circuit 130 may use the reconstruction circuit 131 to selectively reconstruct macroblocks on an as needed basis.

The de-blocking filter 133 may be implemented to remove blocking artifacts that may be introduced by block prediction errors. The de-blocking filter 133 generally operates on the horizontal and vertical block edges within the predictive loop.

During the estimation and mode decision stage of the system 100, an array indicating the macroblock modes for every macroblock in a frame is maintained (as shown in TABLE 1). The reconstruction stage for a macroblock is only performed if neighboring macroblocks need to reference reconstructed pixels for the intra prediction mode. The number of macroblocks to be reconstructed may further be reduced by using the flag CIPF from the MPEG-4 Part 10 specification. The prediction of intra mode macroblocks use pixels of neighbor intra-coded macroblocks. Therefore, only I-frame macroblocks may need to be reconstructed for B-frame processing.

In the second method, the deblocking filter step of the reconstruction is skipped entirely. In particular, inter-picture prediction is performed from reconstructed frames that have been filtered by the deblocking filter 133. However, B-frames are not used for temporal prediction. Also, intra mode prediction is performed using prediction pixels before the deblocking filter is applied. Therefore, it is possible to skip the deblocking filter 132 step for B-frames.

The present invention may (i) reduce the complexity of MPEG-4 Part 10 encoding, (ii) use MPEG-4 Part 10 syntax to further reduce encoder complexity, (iii) be implemented in software, and in programmable hardware platforms, (iv) be applied to previous and future video compression standards, (v) be used in a video encoder, transrater, transcoder, and/or statmux system, (vi) produce a bit stream that can be stored, transmitted, or used internal to a system.

While the invention has been particularly shown and described with reference to the preferred embodiments thereof, it will be understood by those skilled in the art that various changes in form and details may be made without departing from the spirit and scope of the invention.

The invention claimed is:

1. A method for implementing B-frame prediction in video compression comprising the steps of:
   (A) setting a prediction flag (i) off if B-frames are used for block prediction and (ii) on if B-frames are not used for block prediction;
   (B) determining whether a current macroblock is a B-frame macroblock;
   (C) when said current macroblock is not a B-frame macroblock, generating an output video signal in response to an input video signal by (i) performing an inverse quantization operation and an inverse transform operation in accordance with a predefined coding specification and (ii) performing a deblocking filtering operation; and
   (D) when said current macroblock is a B-frame macroblock,
      if (i) said current macroblock is an intra macroblock or (ii) said prediction flag is off and said current macroblock is used for intra prediction, generating said output video signal in response to said input video signal by performing said inverse quantization and said inverse transform operations in accordance with said predefined coding specification and bypassing said deblocking filtering operation,
      otherwise, generating said output video signal in response to said input video signal while bypassing said inverse quantization operation, said inverse transform operation and said deblocking filtering operation.

2. The method according to claim 1, wherein said input video signal comprises a series of macroblocks.

3. The method according to claim 2, wherein said method operates (i) in a first mode if said prediction flag is on and (ii) a second mode if said prediction flag is off.

4. The method according to claim 3, wherein (i) said first mode comprises an intra prediction mode and (ii) said second mode comprises an inter prediction mode.

5. The method according to claim 4, wherein said inter prediction mode uses information from a previous one of said macroblocks to encode a subsequent one of said macroblocks.

6. The method according to claim 2, further comprising the steps of:
   generating an array configured to store macroblock modes used to encode each of said macroblocks; and
   reconstructing the current macroblock if said mode information indicates said current macroblock is needed to encode a neighboring macroblock.

7. The method according to claim 1, wherein said method reduces complexity on B-frame macroblock encoding when B-frames are not used for prediction.

8. The method according to claim 1, wherein said output video signal comprises an H.264 compliant encoded bitstream.

9. The method according to claim 1, further comprising the step of:
   reconstructing an I-frame macroblock if said prediction flag is on.

10. The method according to claim 9, further comprising the step of:
    skipping said reconstruction step if said prediction flag is off.

11. The method according to claim 1, wherein said prediction flag comprises a constrained intra prediction flag (CIPF).

12. The method according to claim 1, further comprising the step of:
    (E) forcing a decoder to not use intra macroblocks in B-frame processing; and
    skipping step (A) when step (E) is implemented.

* * * * *